US012561859B2

(12) United States Patent
Chaudhary et al.

(10) Patent No.: US 12,561,859 B2
(45) Date of Patent: Feb. 24, 2026

(54) METHOD AND SYSTEM FOR VISUALIZING A GRAPH

(71) Applicant: S&P Global Inc., New York, NY (US)

(72) Inventors: Abhishek Chaudhary, Louisville, KY (US); Harpreet Kaur, New York City, NY (US); Shankar Krishnamurthy, Dayton, NJ (US); Swamy Kocherlakota, West Windsor, NJ (US)

(73) Assignee: S&P Global Inc., New York, NY (US)

( * ) Notice: Subject to any disclaimer, the term of this patent is extended or adjusted under 35 U.S.C. 154(b) by 250 days.

(21) Appl. No.: 18/501,462

(22) Filed: Nov. 3, 2023

(65) Prior Publication Data

US 2025/0148664 A1 May 8, 2025

(51) Int. Cl.
G06T 11/20 (2026.01)
(52) U.S. Cl.
CPC .................................. G06T 11/206 (2013.01)
(58) Field of Classification Search
None
See application file for complete search history.

(56) References Cited

U.S. PATENT DOCUMENTS 9,749,406 B1 * 8/2017 Jurgens ................ H04L 67/1061
9,836,183 B1 12/2017 Love et al.

2015/0220530 A1 * 8/2015 Banadaki ................ G06F 16/90
  707/723
2016/0189028 A1 * 6/2016 Hu ....................... G06F 3/04842
  706/46
2021/0191932 A1 * 6/2021 de Jong .............. G06F 16/2453

OTHER PUBLICATIONS

Julio Santisteban, Javier Tejada-Cárcamo, "Unilateral Weighted Jaccard Coefficient for NLP", 2015, 2015 Fourteenth Mexican International Conference on Artificial Intelligence (MICAI), pp. 14-20 (Year: 2015).*
Arsintescu, "How Liquid Connects Everything So Our Members Can Do Anything," LinkedIn Engineering, May 2, 2023, 7 pages, LinkedInCorporation, accessed Oct. 30, 2023, https://engineering.linkedin.com/blog/2023/how-liquid-connects-everything-so-our-members-can-do-anything#:~:text=In%20this%20post%2C%20we%20will,--%20all%20in%20real%20time.

(Continued)

*Primary Examiner* — Michael J Cobb
(74) *Attorney, Agent, or Firm* — Yee & Associates, P.C.

(57) ABSTRACT

A method for identifying relationships between nodes in a graph is provided. The method comprises determining a count of relationships for each relationship type associated with each node in a pair of nodes on the graph. The relationship types are represented by edges connected to the nodes in the pair of nodes. A number of common relationships are determined between the pair of nodes for each relationship type. A count for each common relationship is determined for the number of common relationships between the pair of nodes. A similarity coefficient for each common relationship is determined based on the count for each common relationship and the count of relationships for each relationship type associated with each node in the pair of nodes. A weighted score is generated to represent strength for relationships between the pair of nodes using the similarity coefficients.

15 Claims, 9 Drawing Sheets

(56) References Cited

OTHER PUBLICATIONS

Author Unknown, "Apache TinkerPop," 73 pages, Apache.org, accessed Oct. 30, 2023, https://tinkerpop.apache.org/docs/current/dev/provider/.

Author Unknown, "Node Similarity," The Neo4j Graph Data Science Library Manual v2.5, 7 pages, neo4j Docs, accessed Oct. 30, 2023, https://neo4j.com/docs/graph-data-science/current/algorithms/node-similarity/.

Cardinal, "Similarity Measures and Graph Adjacency with Sets: Data Science in Archaeology, Part II," Towards Data Science, Oct. 28, 2022, 16 pages, Medium, accessed Oct. 30, 2023, https://towardsdatascience.com/similarity-measures-and-graph-adjacency-with-sets-a33d16e527e1C.

Kogge, "Jaccard Coefficients as Potential Graph Benchmark," 2016 IEEE International Parallel and Distributed Processing Symposium Workshops, 2016, pp. 921-928, IEEE, accessed Oct. 30, 2023, https://ieeexplore.ieee.org/ document/7529958.

Lebedev, et al., "Link Prediction Using Top-k Shortest Distances," 31st British International Conference on Databases, Jul. 10-12, 2017, pp. 101-105, Springer, accessed Oct. 30, 2023, https://link.springer.com/chapter/10.1007/978-3-319-60795-5_10.

Li, et al., "Circular Jaccard distance based multi-solution optimization for traveling salesman problems," Mathematical Biosciences and Engineering, Mar. 2, 2022, pp. 4458-4480, AIMS Press, accessed Oct. 30, 2023, http://dx.doi.org/10.3934/mbe.2022206.

Varma, et al., "Jaccard Based Similarity Index in Graphs: A Multi-Hop Approach," 2022 IEEE Delhi Section Conference (DELCON), 2022, 4 pages, IEEE, accessed Oct. 30, 2023, https://ieeexplore.ieee.org/abstract/document/9753316.

* cited by examiner

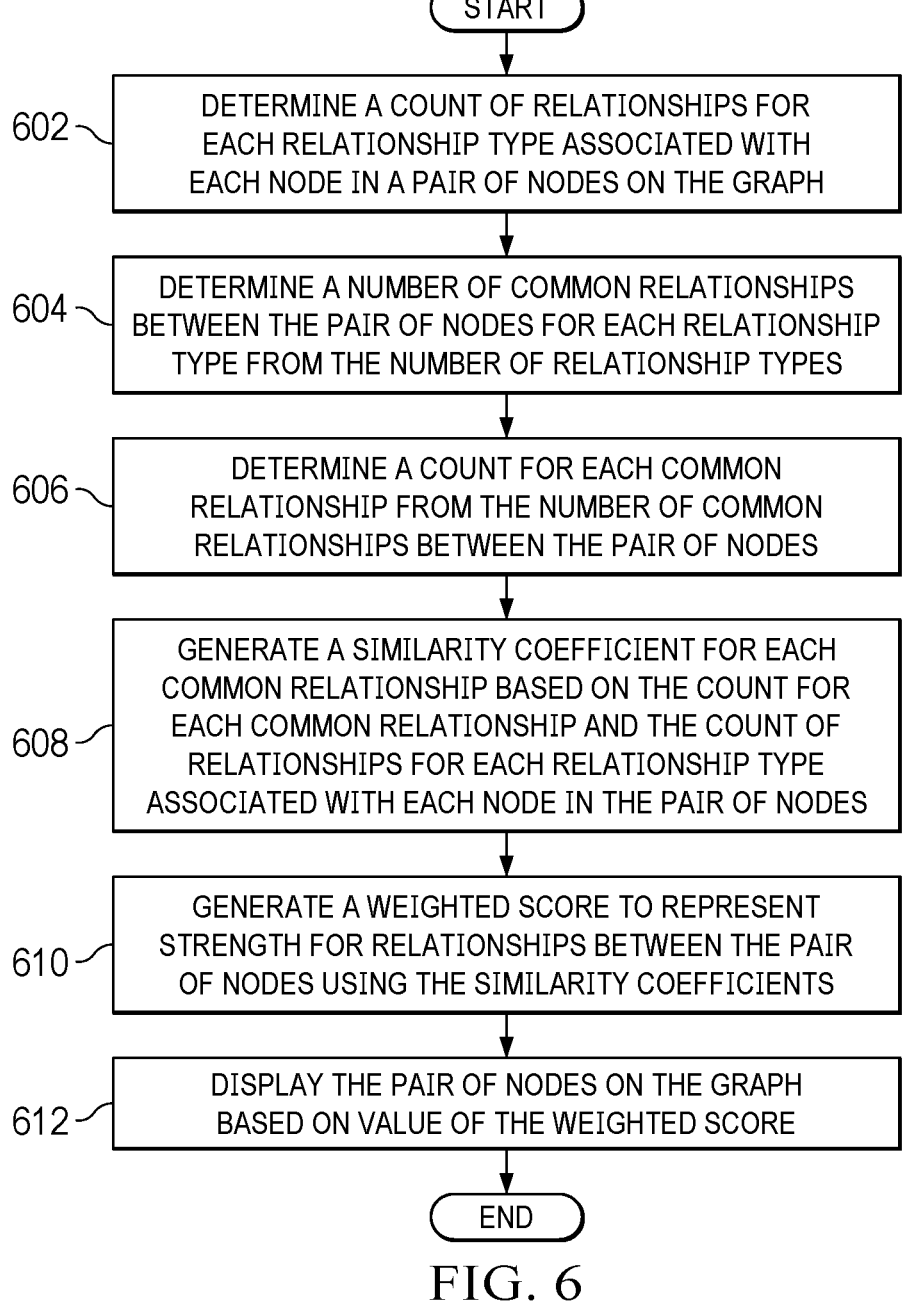

START

602 — DETERMINE A COUNT OF RELATIONSHIPS FOR EACH RELATIONSHIP TYPE ASSOCIATED WITH EACH NODE IN A PAIR OF NODES ON THE GRAPH

604 — DETERMINE A NUMBER OF COMMON RELATIONSHIPS BETWEEN THE PAIR OF NODES FOR EACH RELATIONSHIP TYPE FROM THE NUMBER OF RELATIONSHIP TYPES

606 — DETERMINE A COUNT FOR EACH COMMON RELATIONSHIP FROM THE NUMBER OF COMMON RELATIONSHIPS BETWEEN THE PAIR OF NODES

608 — GENERATE A SIMILARITY COEFFICIENT FOR EACH COMMON RELATIONSHIP BASED ON THE COUNT FOR EACH COMMON RELATIONSHIP AND THE COUNT OF RELATIONSHIPS FOR EACH RELATIONSHIP TYPE ASSOCIATED WITH EACH NODE IN THE PAIR OF NODES

610 — GENERATE A WEIGHTED SCORE TO REPRESENT STRENGTH FOR RELATIONSHIPS BETWEEN THE PAIR OF NODES USING THE SIMILARITY COEFFICIENTS

612 — DISPLAY THE PAIR OF NODES ON THE GRAPH BASED ON VALUE OF THE WEIGHTED SCORE

END

FIG. 6

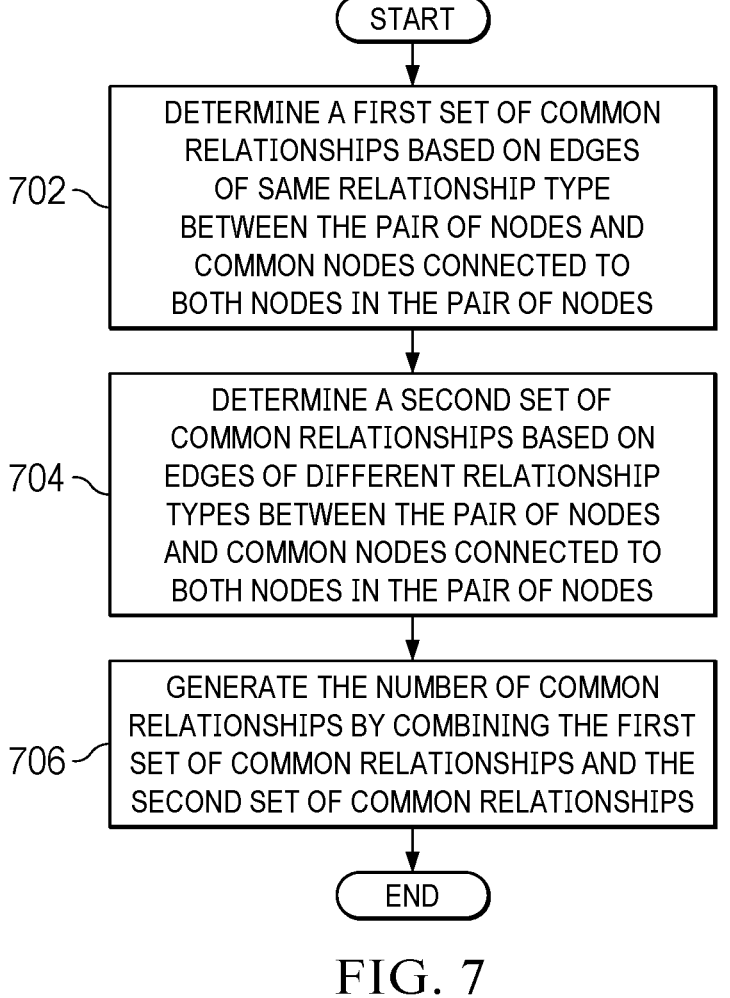

START

702 ~ DETERMINE A FIRST SET OF COMMON RELATIONSHIPS BASED ON EDGES OF SAME RELATIONSHIP TYPE BETWEEN THE PAIR OF NODES AND COMMON NODES CONNECTED TO BOTH NODES IN THE PAIR OF NODES

704 ~ DETERMINE A SECOND SET OF COMMON RELATIONSHIPS BASED ON EDGES OF DIFFERENT RELATIONSHIP TYPES BETWEEN THE PAIR OF NODES AND COMMON NODES CONNECTED TO BOTH NODES IN THE PAIR OF NODES

706 ~ GENERATE THE NUMBER OF COMMON RELATIONSHIPS BY COMBINING THE FIRST SET OF COMMON RELATIONSHIPS AND THE SECOND SET OF COMMON RELATIONSHIPS

END

FIG. 7

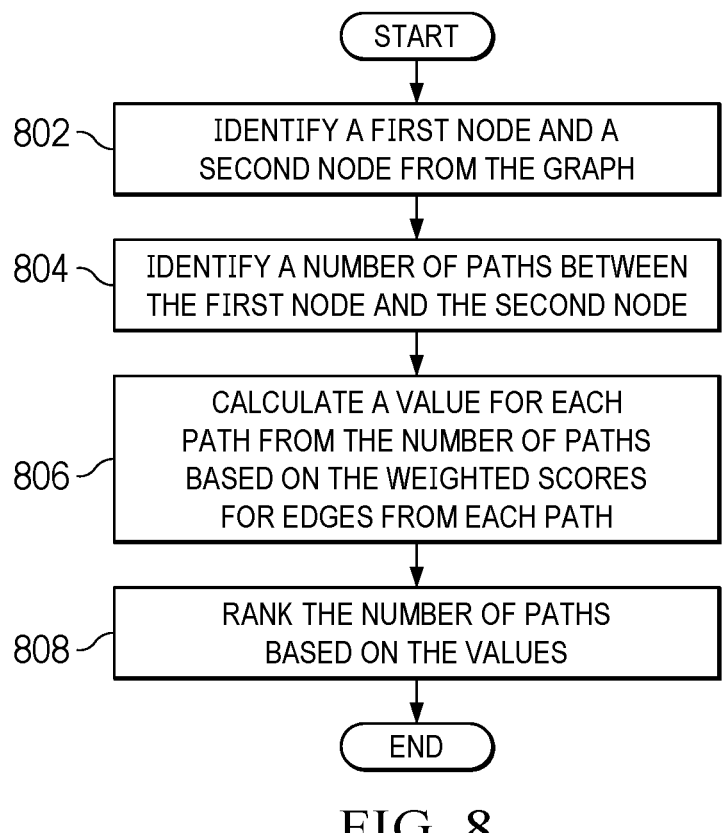

START

802 — IDENTIFY A FIRST NODE AND A
SECOND NODE FROM THE GRAPH

804 — IDENTIFY A NUMBER OF PATHS BETWEEN
THE FIRST NODE AND THE SECOND NODE

806 — CALCULATE A VALUE FOR EACH
PATH FROM THE NUMBER OF PATHS
BASED ON THE WEIGHTED SCORES
FOR EDGES FROM EACH PATH

808 — RANK THE NUMBER OF PATHS
BASED ON THE VALUES

END

FIG. 8

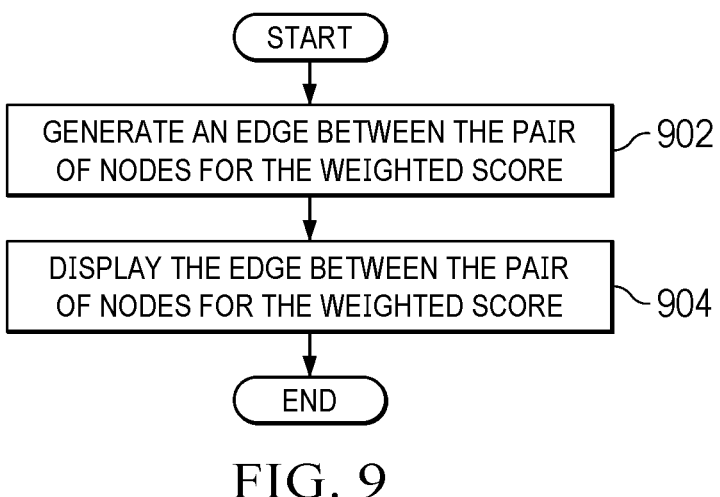

START

GENERATE AN EDGE BETWEEN THE PAIR
OF NODES FOR THE WEIGHTED SCORE — 902

DISPLAY THE EDGE BETWEEN THE PAIR
OF NODES FOR THE WEIGHTED SCORE — 904

END

FIG. 9

METHOD AND SYSTEM FOR VISUALIZING A GRAPH

BACKGROUND INFORMATION

1. Field

The present disclosure relates generally to visualization of graphs, and more specifically to a method and system for visualizing relationships between nodes on a graph.

2. Background

A graph is a visual representation for collection of objects and the relationships between the objects. A graph includes nodes that represent objects and edges that are connections between the nodes. In this illustrative example, the edges represent relationships between the objects represented by the nodes.

Graphs are versatile and widely used data structures that serve as a useful tool to model, analyze and understand complex relationships among entities. Graphs can be used in various domains and disciplines such as computer science, mathematics, social sciences, biology, logistics, or any suitable field where relationships between objects can be explored. For example, graphs can be used for mapping software dependencies, identifying patterns in biological networks, and visualizing social interactions.

SUMMARY

An illustrative embodiment provides a computer-implemented method for identifying relationships between nodes on a graph. The method comprises of determining a count of relationships for each relationship type associated with each node in a pair of nodes on the graph. The relationship types are represented by edges connected to the nodes in the pair of nodes. A number of common relationships are determined between the pair of nodes for each relationship type. A count for each common relationship is determined for the number of common relationships between the pair of nodes. A similarity coefficient for each common relationship is determined based on the count for each common relationship and the count of relationships for each relationship type associated with each node in the pair of nodes. A weighted score is generated to represent the strength of relationships between the pair of nodes using the similarity coefficients.

Another illustrative embodiment provides a system for identifying relationships between nodes in a graph. The system comprises of a storage device configured to store program instructions and one or more processors operably connected to the storage device and configured to execute the program instructions to cause the system to: determine a count of relationships for each relationship type associated with each node in a pair of nodes on a graph wherein the relationship types are represented by edges connected to the nodes in the pair of nodes; determine a number of common relationships between the pair of nodes for each relationship type; determine a count for each common relationship from the number of common relationships between the pair of nodes; generate a similarity coefficient for each common relationship based on the count of relationships for each common relationship and the count for each relationship type associated with each node in the pair of nodes; and generate a weighted score to represent the strength of relationships between the pair of nodes using the similarity coefficients.

Another illustrative embodiment provides a computer program product for identifying relationships between nodes in a graph. The computer program product comprises of a computer readable storage medium having program instructions embodied thereon to perform the steps of: determining a number of common relationships between the pair of nodes for each relationship type; determining a count for each common relationship from the number of common relationships between the pair of nodes; generating a similarity coefficient for each common relationship based on the count for each common relationship and the count of relationships for each relationship type associated with each node in the pair of nodes; and generating a weighted score to represent strength for relationships between the pair of nodes using the similarity coefficients.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 6 depicts a flowchart of a process for identifying relationships between nodes in a graph in accordance with an illustrative embodiment;

FIG. 7 depicts a flowchart of a process for determining common relationships between a pair of nodes on a graph in accordance with an illustrative embodiment;

FIG. 8 depicts a flowchart of a process for determining paths between a pair of nodes on a graph in accordance with an illustrative embodiment;

FIG. 9 depicts a flowchart of a process for displaying the pair of nodes on the graph in accordance with an illustrative embodiment.

DETAILED DESCRIPTION

The illustrative embodiments recognize and take into account one or more different considerations. The illustrative embodiments recognize and take into account that current graph visualization may not accurately reflect the relationships between nodes on a graph.

The illustrative embodiments also recognize and take into account that it is difficult to present relationships in a graph when dealing with large datasets and complex relationships. In this case, a graph can quickly become cluttered and hard to interpret from overlapping nodes and edges. In addition, graph visualization may not scale well when dealing with large datasets since processing graphs with large numbers of nodes and edges can be computationally intensive and may require specialized software or hardware.

The illustrative embodiments also recognize and take into account that different similarity metrics are used for presenting relationships in graphs. The illustrative embodiments also recognize and take into account that different similarity metrics can have different assumptions and parameters, which makes a particular similarity metric not appropriate for every data type.

The illustrative embodiments provide a method and system for identifying relationships between nodes on a graph. The illustrative embodiments include determining a count of relationships for each relationship type associated with each node in a pair of nodes on the graph. The relationship types are represented by edges connected to the nodes in the pair of nodes. A number of common relationships between the pair of nodes are determined for each relationship type from the number of relationship types. A count is determined for each common relationship from the number of common relationships between the pair of nodes. A similarity coefficient is generated for each common relationship based on the count for each common relationship and the count of relationships for each relationship type associated with each node in the pair of nodes. Finally, a weighted score is generated to represent strength for relationships between the pair of nodes using the similarity coefficients.

Figure 1:
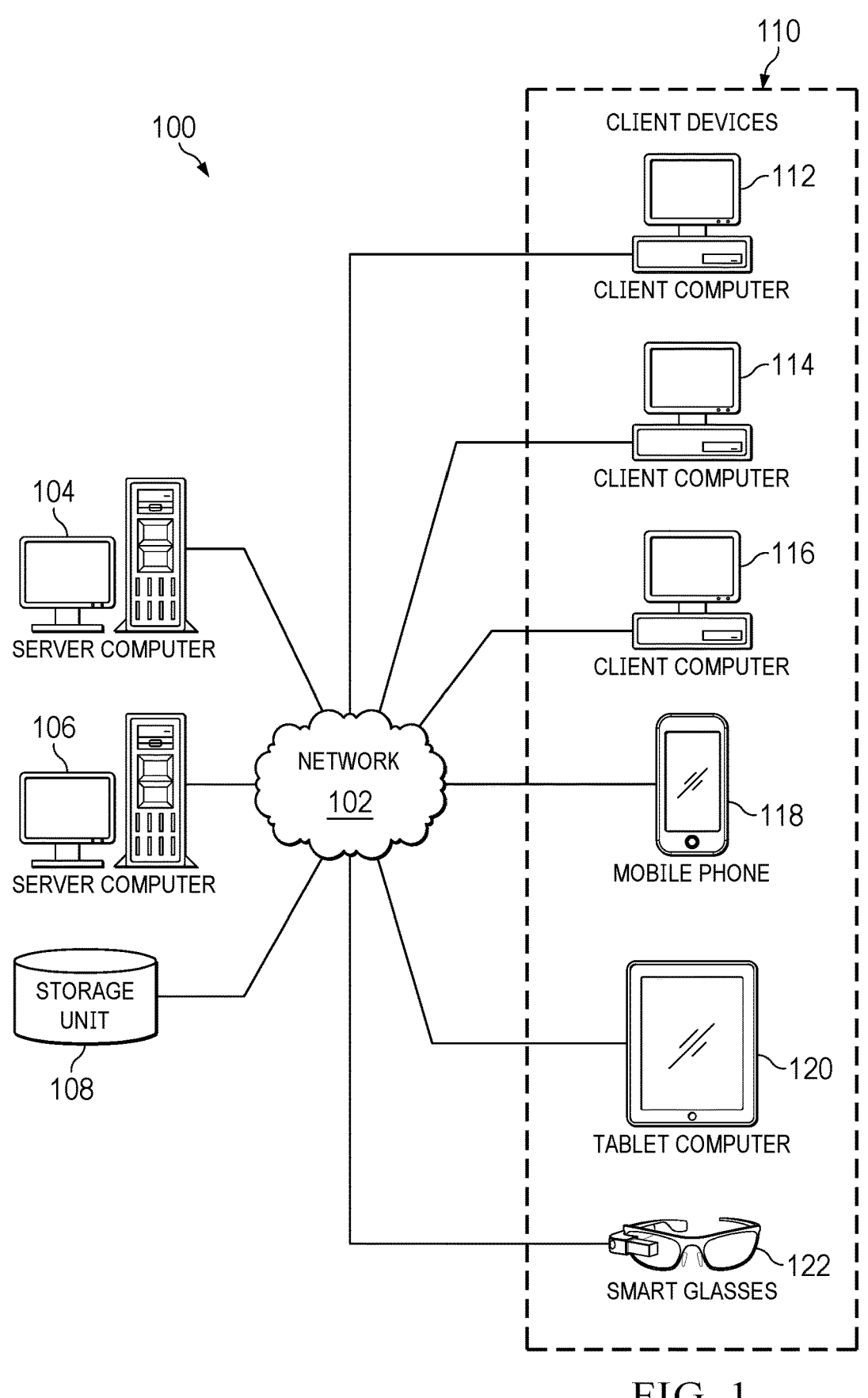
FIG. 1 is a pictorial representation of a network of data processing systems in accordance with an illustrative embodiment.

With reference to FIG. 1, a pictorial representation of a network of data processing systems is depicted in which illustrative embodiments may be implemented. Network data processing system 100 is a network of computers in which the illustrative embodiments may be implemented. Network data processing system 100 contains network 102, which is the medium used to provide communications links between various devices and computers connected within network data processing system 100. Network 102 may include connections, such as wire, wireless communication links, or fiber optic cables.

In the depicted example, server computers 104 and 106 and storage unit 108 connect to network 102. In addition, client devices 110 connect to network 102. In the depicted example, server computers 104 and 106 provide information, such as boot files, operating system images, and applications to client devices 110. Client devices 110 can be, for example, computers, workstations, or network computers. As depicted, client devices 110 include client computers 112, 114, and 116. Client devices 110 can also include other types of client devices such as mobile phone 118, tablet computer 120, and smart glasses 122.

In the illustrative example of FIG. 1, server computers 104 and 106, storage unit 108, and client devices 110 are network devices that connect to network 102 in which network 102 is the communications media for these network devices. Some or all of client devices 110 may form an Internet of things (IoT) in which these physical devices can connect to network 102 and exchange information with each other over network 102.

Program code located in network data processing system 100 can be stored on a computer-recordable storage medium and downloaded to a data processing system or other device for use. For example, the program code can be stored on a computer-recordable storage medium on server computers 104 and 106 and storage unit 108 and downloaded to client devices 110 over network 102 for use on client devices 110.

In the illustrative example of FIG. 1, network 102 can be the internet representing a worldwide collection of networks and gateways that use the Transmission Control Protocol/

Internet Protocol (TCP/IP) suite of protocols to communicate with one another. At the heart of the internet is a backbone of high-speed data communication lines between major nodes or host computers consisting of thousands of commercial, governmental, educational, and other computer systems that route data and messages. Of course, network data processing system 100 also may be implemented using different types of networks. For example, network 102 can be comprised of an intranet, a local area network (LAN), a metropolitan area network (MAN), or a wide area network (WAN). FIG. 1 is intended as an example, and not as an architectural limitation for the different illustrative embodiments.

Figure 2:
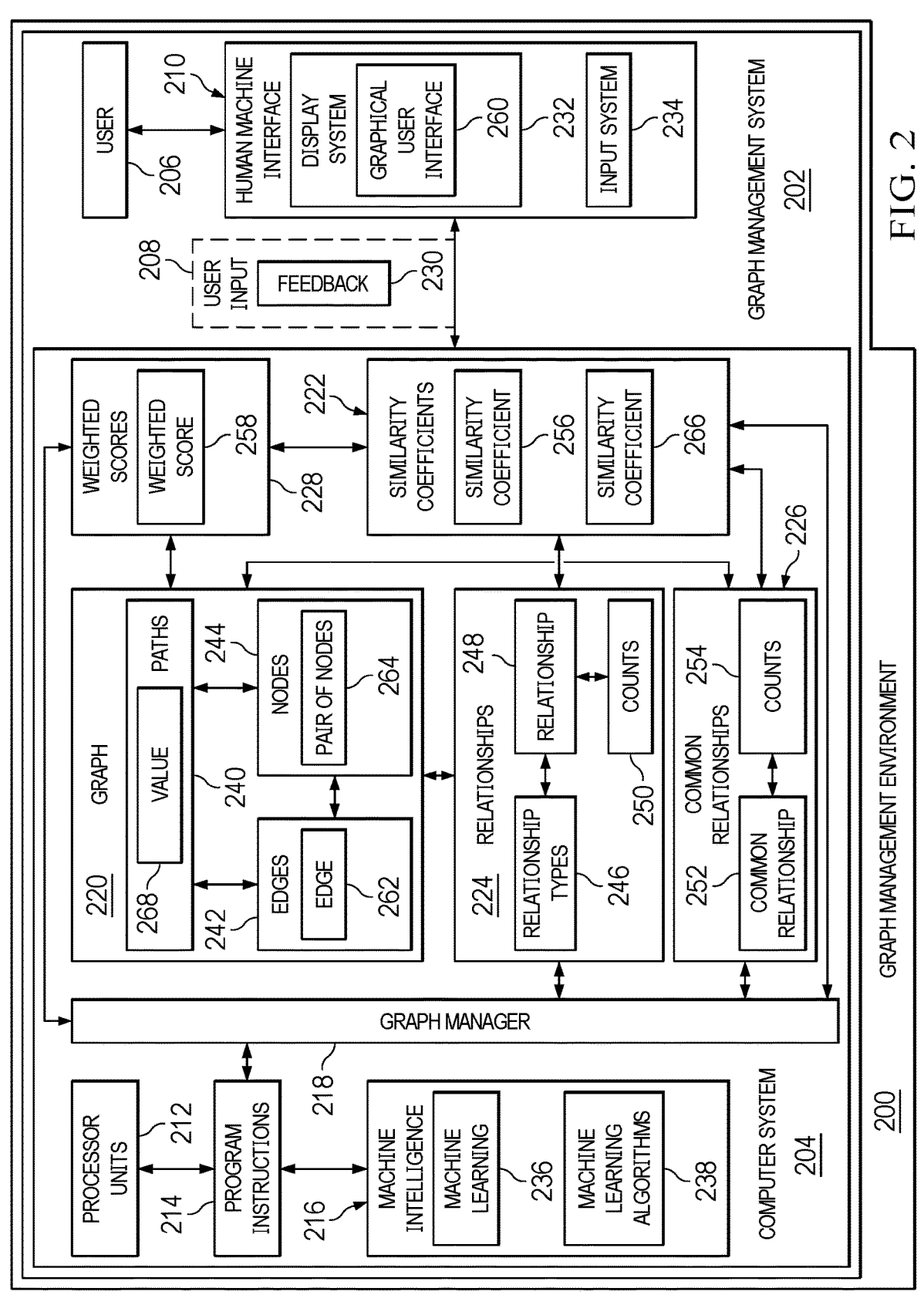
FIG. 2 is a block diagram of a graph management environment in accordance with an illustrative embodiment.

With reference now to FIG. 2, a block diagram of a graph management environment is depicted in accordance with an illustrative embodiment. In this illustrative example, graph management environment 200 includes components that can be implemented in hardware such as the hardware shown in network data processing system 100 in FIG. 1.

In this illustrative example, graph management system 202 in graph management environment 200 can use graph manager 218 to identify relationships between nodes 244 in graph 220 using relationships 224 and common relationships 226. In addition, graph manager 218 can create edges for the identified relationships and identify paths between nodes 244.

Graph management system 202 includes computer system 204 that can be used to manage nodes and edges for a graph. In this illustrative example, computer system 204 is comprised of a number of different components. As depicted, computer system 204 includes graph manager 218.

Graph manager 218 can be implemented in software, hardware, firmware, or a combination thereof. When software is used, the operations performed by graph manager 218 can be implemented in program instructions configured to run on hardware, such as a processor unit. When firmware is used, the operations performed by graph manager 218 can be implemented in program instructions and data and stored in persistent memory to run on a processor unit. When hardware is employed, the hardware can include circuits that operate to perform the operations in graph manager 218.

In the illustrative examples, the hardware can take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform a number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

As used herein, "a number of" when used with reference to items, means one or more items. For example, "a number of operations" is one or more operations.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C, or item B and item C. Of course, any combination of these items can be present. In some illustrative examples, "at least one of" can be, for example, without limitation, two of item A; one of item B; and ten of item C; four of item B and seven of item C; or other suitable combinations.

Computer system 204 is a physical hardware system and includes one or more data processing systems. When more than one data processing system is present in computer system 204, those data processing systems are in communication with each other using a communications medium. The communications medium can be a network. The data processing systems can be selected from at least one of a computer, a server computer, a tablet computer, or some other suitable data processing system.

As depicted, computer system 204 includes a number of processor units 212 that are capable of executing program instructions 214 implementing processes in the illustrative examples. In other words, program instructions 214 are computer readable program instructions.

As used herein, a processor unit in the number of processor units 212 is a hardware device and is comprised of hardware circuits such as those on an integrated circuit that respond to and process instructions and program instructions that operate a computer. When the number of processor units 212 executes program instructions 214 for a process, the number of processor units 212 can be one or more processor units that are in the same computer or in different computers. In other words, the process can be distributed between processor units 212 on the same or different computers in computer system 204.

Further, the number of processor units 212 can be of the same type or different type of processor units. For example, the number of processor units 212 can be selected from at least one of a single core processor, a dual-core processor, a multi-processor core, a general-purpose central processing unit (CPU), a graphics processing unit (GPU), a digital signal processor (DSP), or some other type of processor unit.

Computer system 204 further includes machine intelligence 216. Machine intelligence 216 is comprised of machine learning 236 and machine learning algorithms 238. Machine learning 236 is a branch of artificial intelligence (AI) that enables computers to detect patterns and improve performance without direct programming commands. Rather than relying on direct input commands to complete a task, machine learning 236 relies on input data. The data is fed into the machine, one of machine learning algorithms 238 is selected, parameters for the data are configured, and the machine is instructed to find patterns in the input data through optimization algorithms. The data model formed from analyzing the data is then used to predict future values. In this illustrative example, the learning of graph manager 218 can be achieved through a database input that is continuously refined over time through trial and error. Equivalence of assets or products can be effectively performed by supervised machine learning so that products or assets that do not match descriptively can nevertheless be matched. Over time, the data model from machine learning can provide a greater degree of flexibility in matching for graph manager 218.

Machine intelligence 216 can be implemented using one or more systems such as an artificial intelligence system, a neural network, a Bayesian network, an expert system, a fuzzy logic system, a genetic algorithm, or other suitable types of systems. Machine learning 236 and machine learning algorithms 238 may make computer system 204 a special purpose computer for dynamic predictive modelling for managing graphs.

Machine learning 236 involves using machine learning algorithms 238 to build machine learning models based on samples of data. The samples of data used for training are referred to as training data or training datasets. Machine learning models are trained using training datasets and make predictions without being explicitly programmed to make these predictions. Machine learning models can be trained and retrained for a number of different types of applications. These applications include, for example, medicine, healthcare, speech recognition, computer vision, or other types of applications.

Machine learning algorithms 238 can include supervised machine learning algorithms and unsupervised machine learning algorithms. Supervised machine learning can train machine learning models using data containing both the inputs and desired outputs. Examples of machine learning algorithms include XGBoost, K-means clustering, and random forest. In this illustrative example, machine learning models in machine intelligence 216 can be used to help graph manager 218 for generating graph 220, identifying relationships 224 and common relationships 226, and generating paths 240 for nodes 244.

In computer system 204, graph manager 218 can manage graph 220 created based on a number of datasets. In this illustrative example, graphs such as graph 220 are visual representation of relationships between various objects represented by nodes 244.

As depicted, graph 220 includes edges 242 and nodes 244. Nodes 244 represent objects in the graph. In this illustrative example, nodes 244 can be objects such as people, locations, items, transactions, devices, companies, educational institutions, interests shared between people, or any suitable objects that have a relationship with other objects represented by nodes in nodes 244.

Edges 242 are connections between nodes 244 in graph 220. In this illustrative example, edges 242 can represent relationships, interaction, or associations between objects represented by nodes 244.

In this illustrative example, graph manager 218 can identify relationships 224 for edges 242. Relationships 224 includes all relationships represented by edges 242. Relationships 224 include relationship types 246. Relationship types 246 define the nature of edges in edges 242. In this example, relationship types 246 can be used to specify different interactions or associations between two nodes.

For example, an edge in edges 242 can be a connection between a first node and a second node from nodes 244, where the first node is a person and the second node is a university. In this example, the edge between the first node and the second node can represent a relationship from relationships 224. The relationship can have a relationship type from relationship types 246 that indicates the person of the first node attended or worked at the university of the second node.

In an alternative example, an edge in edges 242 can be a connection between a first node and a second node, where the first node is a person and the second node is an interest or hobby such as scuba diving. In a similar fashion, the edge between the first node and the second node can represent a relationship from relationships 224. In this case, the relationship can have a relationship type from relationship types 246 that indicates the person of the first node has interests or has the hobby of scuba diving of second node.

Graph manager 218 can determine counts 250 for relationships 224. In this example, counts 250 are numbers of relationships for each relationship type associated with each node in nodes 244. For example, if a person represented by a node in nodes 244 had a position in company A, the count for relationships of relationship type "had position at" will be one. In addition, if the person also attended university A for a master's degree, the count for relationships of relationship type "attended" will be one. In other words, the count of relationships for each relationship type associated with each node in nodes 244 can be determined by counting edges that represent relationships of the same relationship type for each node.

In this illustrative example, graph manager 218 can identify common relationships for nodes 244. For example, graph manager 218 can identify common relationships 226 for pair of nodes 264. In this illustrative example, common relationships 226 are represented by edges between two nodes and a common node that connects the two nodes. Common relationships 226 can be common relationships based on same relationship type. For example, a first edge can be a connection between a first node and a second node, where the first node is a person and the second node is a company. A second edge can be a connection between a third node and the second node, where the third node is a person.

In this example, both the first edge and the second edge represent relationships that have the relationship type of "works at," which indicates that both person of first node and person of third node work at company of the second node. Therefore, the first node and the third node can have a common relationship from common relationships 226 since both the person of the first node and the person of the third node work at the company of the second node.

Examples of common relationships based on same relationship type can include "works common" that represents two people that work at the same company, "current position common" that represents two people who have positions at the same company, "past position common" that represents two people that had positions at the same company, "current board common" that represents two people currently have board positions at the same company, "past board common" that represents two people who had board positions at the same company, and "education common" that represents two people who went to the same educational institution.

In an alternative example, graph manager 218 can also identify common relationships 226 based on different relationship types from relationship types 246. For example, a first edge can be a connection between a first node and a second node, where the first node is a person and the second node is a company. A second edge can be a connection between the third node and the second node, where the third node is a person.

In this example, the first edge represents a relationship that has relationship type of "works at" and the second edge represents a relationship that has relationship type of "has board position." Even though the first edge and the second edge represent relationships of different relationship types, the first node and the third node still have common relationships because the first edge and the second edge connect both the first node and the third node to a common node. In this example, the common relationship between the first node and third node has a relationship type of "works past board position common," which indicates that person of the first node and person of the third node either works at or had a board position in the same company.

Other examples of common relationships of different type can include "works current position common" that represents one person who either works at or has a position at a company and the other person who either works at or has position at the same company, "works past position common" that represents one person who either worked at or had a position at a company and the other person either worked at or had a position at the same company, and "works current board common" that represents one person who either works at or has a board position at a company and the other person who either works at or has a board position at the same company.

In a similar fashion, graph manager 218 can determine counts 254 for common relationships 226. Each count in counts 254 is a count of a common relationship associated with two nodes in nodes 244. For example, if a first person represented by a first node in nodes 244 has edges connected to a second node that represents a first company and a third node that represents a second company. In addition, a second person represented by a fourth node in nodes 244 also has edges connected to the second node and the third node.

In this example, the edge between the first node and the second node represents that the first person had a board position in the first company and the edge between the first node and the third node represents that the first person works at the second company. On the other hand, the edge between the fourth node and the second node represents that the second person works at the first company and the edge between the fourth node and the third node represents that the second person had a board position in the second company.

In this illustrative example, the first person and the second person have a common relationship because they both worked for or had board positions in the same company. As a result, the count for the common relationship will be two because the first person and the second person are both associated to the same two companies. In this illustrative example, the two common relationships between the first person and the second person are distinguished for weighting purposes.

Graph manager 218 can use counts 250 and counts 254 to calculate similarity coefficients 222 for nodes 244 in graph 220. In this example, similarity coefficients 222 are measures used to quantify the similarity or dissimilarity between two nodes in nodes 244. In this illustrative example, similarity coefficients 222 can be cosine similarity, Jaccard similarity, Euclidean distance, Manhattan distance, or any suitable similarity metrics that measures the similarity between two nodes in a graph. In this illustrative example, a similarity coefficient is determined for each relationship in relationships 224 and each common relationship in common relationships 226.

In this illustrative example, graph manager 218 can assign a weight to each similarity coefficient in similarity coefficients 222 and generate weighted scores 228 for nodes 244. Each weighted score in weighted scores 228 is a cumulative value that considers weighted similarity coefficients for all relationships and common relationships between two nodes. In this example, each weighted score in weighted scores 228 represents strength of relationship between two nodes in nodes 244.

The weighting can be performed based on determinations of importance of relationships and common relationships. In this example, the importance of relationships and common relationships can be determined manually or using probabilistic model, stochastic model, or any suitable machine learning models from machine intelligence 216. For example, the weighted scores 228 can be generated based on temporal information associated with relationships 224 and common relationships 226. In other words, recent relationships and common relationships will be assigned with greater weights compared to ancient relationships and common relationships.

In this illustrative example, graph manager 218 can create edges for two nodes in nodes 244 based on weighted scores calculated for the two nodes. For example, graph manager 218 can identify relationship 248 and common relationship 252 for pair of nodes 264. In this example, graph manager 218 can determine a count for relationship 248 and a count for common relationship 252.

In addition, graph manager 218 can determine similarity coefficient 256 for relationship 248 and similarity coefficient 266 for common relationship 252 based the counts determined for relationship 248 and common relationship 252. Subsequently, graph manager 218 can generate weighted score 258 for pair of nodes 264 based on similarity coefficient 256 and similarity coefficient 266.

In this example, graph manager 218 can create edge 262 for pair of nodes 264 based on weighted score 258. As depicted, edge 262 represents the strength of relationships between pair of nodes 264.

Graph manager 218 can also generate paths 240 for nodes in nodes 244. Each path in paths 240 includes a number of edges that connect two or more nodes in nodes 244. In this example, paths 240 allow users to traverse from one node to another while following the edges. In graph 220, paths 240 represent connection and associations between nodes in nodes 244.

In this illustrative example, paths 240 include values 268 that represent the level of separation or connectedness between nodes in nodes 244. Values 268 can be calculated based on weighted scores for edges included in each path from paths 240. For example, values 268 can be calculated by multiplying or adding weighted scores for edges included in each path from paths 240.

In this illustrative example, computer system 204 receives a user input 208 from user 206. In this example, user input 208 can be generated by user 206 using human machine interface (HMI) 210. As depicted, human machine interface 210 includes display system 232 and input system 234. Display system 232 is a physical hardware system and includes one or more display devices on which graphical user interface 260 can be displayed. The display devices can include at least one of a light emitting diode (LED) display, an organic light emitting diode (OLED) display, a computer monitor, a projector, a flat panel display, a heads-up display (HUD), a head-mounted display (HMD), smart glasses, augmented reality glasses, or some other suitable device that can output information for the visual presentation of information.

In this example, user 206 is a person that can interact with graphical user interface 260 through user input 208 generated by input system 234. Input system 234 is a physical hardware system and can be selected from at least one of a mouse, a keyboard, a touch pad, a trackball, a touchscreen, a stylus, a motion sensing input device, a gesture detection device, a data glove, a cyber glove a haptic feedback device, or some other suitable type of input device.

In one illustrative example, computer system 204 can receive commands in user input 208 for generating graph 220 to present paths 240 and edges 242 between nodes 244. In addition, the command can also be used to present edge 262 generated between pair of nodes 264.

Graph manager 218 can display information to user 206 over human machine interface 210. For example, graph manager 218 can display graph 220 with nodes 244, edges 242, and paths 240 in graphical user interface 260 on display system 232. In this illustrative example, graph 220 can be visualized based on a number of parameters.

For example, size for nodes 244 can be adjusted based on weighted scores for edges connected to each node, colors of nodes 244 can be varied based on type of object each node represents. In another example, edges 242 can have different thickness for different edges based on the weighted score for each edge and dash lines can be used to present edges with low weighted scores. In addition, paths 240, edges 242 and nodes 244 can be highlighted to present specific paths, edges, and nodes in graph 220.

In this example, user 206 can also review graph 220 through graphical user interface 260 to provide feedback 230 to graph manager 218. After reviewing expanded graph 220, user 206 can provide feedback 230 through user input 208 to graph manager 218 based on the accuracy of graph 220. The accuracy of graph 220 can includes accuracy for edges 242, accuracy for relationships 224 and common relationships 226 between nodes 244.

In this illustrative example, machine learning algorithm 238 in machine intelligence 216 can use feedback from feedback 230 in user input 208 received from user 206 to retrain machine learning models for generating graph 220, identifying relationships 224 and common relationships 226, and generating paths 240 for nodes 244.

In one illustrative example, one or more solutions are present that overcome issues with accurately and efficiently identifying relationships. The use of graph manager 218 can provide comprehensive information of nodes on a graph through different combinations of relationships between nodes on a graph. The speed and accuracy in identifying relationships that can be added to nodes on a graph are improved.

Computer system 204 can be configured to perform at least one of the steps, operations, or actions described in the different illustrative examples using software, hardware, firmware, or a combination thereof. As a result, computer system 204 operates as a special purpose computer system in which graph manager 218 in computer system 204 enables management of nodes and edges for a graph. In particular, graph manager 218 transforms computer system 204 into a special purpose computer system as compared to currently available general computer systems that do not have graph manager 218.

In the illustrative example, the use of graph manager 218 in computer system 204 integrates processes into a practical application for managing and presenting graphs to increase the performance of computer system 204. In other words, graph manager 218 in computer system 204 is directed to a practical application of processes integrated into graph manager 218 in computer system 204 for identifying and presenting relationships between nodes on a graph. In addition, graph manager 218 in computer system 204 requires less memory to identify paths between nodes on a graph. As a result, graph manager 218 in computer system 204 increases the accuracy and efficiency in identifying and presenting complex relationships between nodes on a graph.

The illustration of graph management environment 200 in FIG. 2 is not meant to imply physical or architectural limitations to the manner in which an illustrative embodiment can be implemented. For example, multiple relationships and multiple common relationships can be involved when calculating weighted scores for an edge between nodes.

Further, other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

Figure 3:
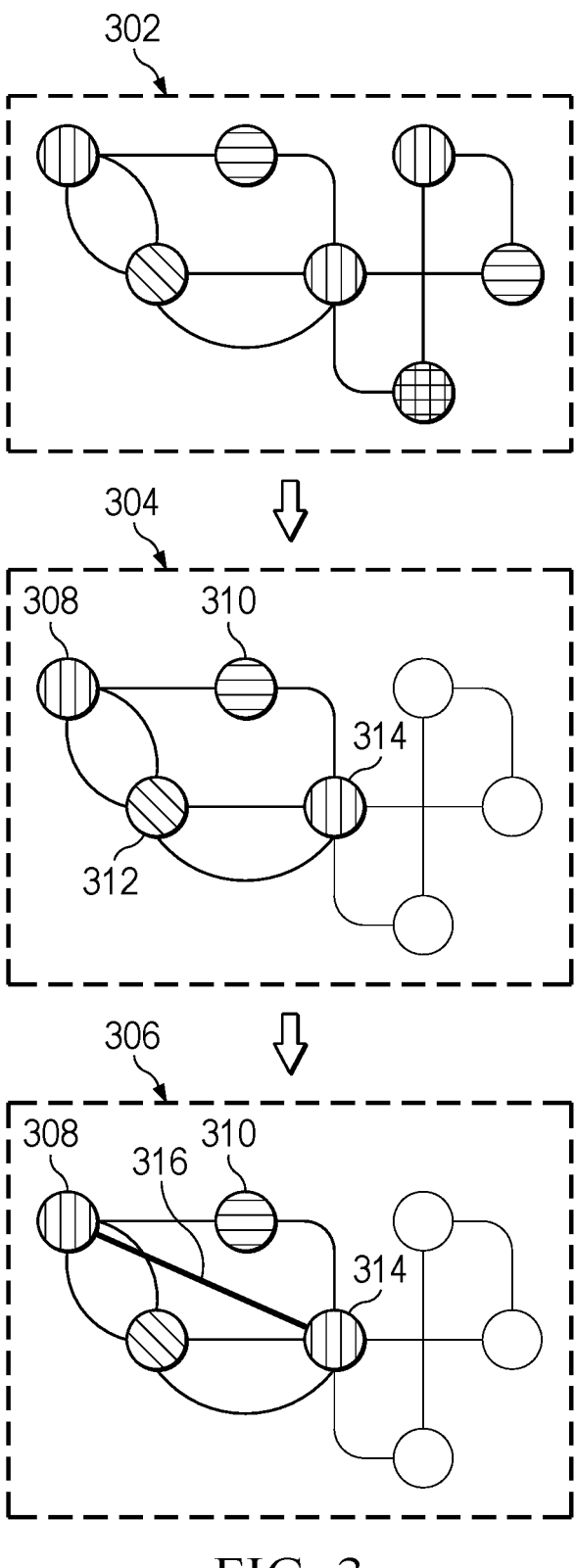
FIG. 3 is an illustration of generating an edge on a graph in accordance with an illustrative embodiment.

Turning now to FIG. 3, an illustration of generating an edge on a graph is depicted in accordance with an illustrative embodiment. In this illustrative example, the generation of the edge on the graph can be performed using graph manager 218 in FIG. 2.

Graph 302 includes a number of nodes and edges between the number of nodes. In this illustrative example, the number of nodes include nodes for people and nodes for companies.

Graph 304 is a highlighted version of graph 302. In graph 304, nodes of interests and edges of interests are highlighted. In this illustrative example, node 308 and node 314 represent people and node 310 and node 312 represent two companies that have associations with the person of node 308 and the person of node 314.

In graph 304, the two edges between node 308 and node 312 represent that the person of node 308 had a board position in the company of node 312 and currently holds a position at the company of node 312. In this illustrative example, the two edges between node 308 and node 312 have the relationship type of "past board position" and "current position." In addition, the edge between node 308 and node 310 represent that the person of node 308 currently works at the company of node 310. In this example, the edge between node 308 and node 310 has the relationship type of "works at."

In a similar fashion, the two edges between node 314 and node 312 represent that the person of node 314 had a board position in the company of node 312 and currently holds a position in the company of node 312. In this illustrative example, the two edges between node 314 and node 312 have the relationship type of "past board position" and "current position." In addition, the edge between node 314 and node 310 represent that the person of node 314 currently works at the company of node 310. In this example, the edge between node 314 and node 310 has the relationship type of "works at."

In this illustrative example, node 308 has edges that represent relationships of three types which include the "works at" relationship, "past board position" relationship, and "current position" relationship. Each of these relationships has a count of one.

In a similar fashion, node 314 has edges that represent relationships of three types which include the "works at" relationship, "past board position" relationship, and "current position" relationship. Each of these relationships has a count of one.

In this illustrative example, common relationships based on the same type of relationships between node 314 and node 308 can include a common relationship of "common works at" with count of one, since the person of node 314 and the person of node 308 both work at the company of node 310. In this illustrative example, a Jaccard coefficient can be calculated for common relationship of "common works at" for node 314 and node 308 using following equation:

$$\text{Jaccard common works at} = \frac{\substack{\text{count of "common works at"} \\ \text{common relationship}}}{\substack{\text{counts of "common works at"} \\ \text{common relationships from both} \\ \text{nodes} - \text{count of "common works at"} \\ \text{common relationship} + \text{small float}}} \quad (1)$$

where the count of "common works at" common relationship is the count of "common works at" common relationship for node 308 and node 314, counts of "common works at" common relationships from both nodes is determined based on the counts for common relationships with "common works at" relationship types between node 308 and any other nodes, and counts for common relationships with "common works at" relationship types between node 314 and any other nodes, and the small float is a small number added for arithmetic purposes. In this illustrative example, counts of relationships from both nodes includes one common relationship between node 308 and node 314 because they both works at the company of node 310, and one common relationship between node 314 and node 308 because they both works at the company of node 310.

In this example, the Jaccard coefficient for the "common works at" common relationship between node 308 and node 314 equals to $(1)/((1+1)-1+\text{small float})=1$ In addition, common relationships based on different types of relationships between node 308 and node 314 can include a common relationship of "current position past board common" with a count of two since the person of node 308 had a board position at the company of node 312 where the person of node 314 has a current position, and the person of node 314 had a board position at the company of node 310 where the person of node 308 has a current position.

In this illustrative a Jaccard example, coefficient can be calculated for common relationship of "current position past board common" for node 314 and node 308 using following equation:

$$\text{Jaccard current position past board common} = \quad (2)$$
$$\frac{\text{count of "current position past board" common relationship}}{\substack{\text{counts of "current position past board"} \\ \text{common relationships from both nodes} - \\ \text{count of "current position past board"} \\ \text{common relationship} + \text{small float}}}$$

where the count of "current position past board" common relationship is the count of "current position past board" common relationship for node 308 and node 314. Counts of "current position past board" common relationship from both nodes includes common relationships between node 308 and any other node where the person of node 308 and a person of any other node either has a current position or had a past board position in the same company. In addition, counts of the "current position past board" common relationship from both nodes includes common relationships between node 314 and any other node where the person of node 314 and a person of any other node either has a current position or had a past board position in the same company.

In this illustrative example, counts of the "current position past board" common relationship from both nodes do not include the common relationship where person of node 308 and a person of any other node both have current positions in the same company or had past board positions in the same company. In a similar fashion, counts of the "current position past board" common relationship from both nodes do not include the common relationship where the person of node 314 and a person of any other node both have current positions in the same company or had past board positions in the same company.

In this illustrative example, the Jaccard coefficient for the "current position past board common" common relationship between node 308 and node 314 equals to 2/((1+1+1+1)–2+small float)=1

In this example, Jaccard illustrative coefficients are calculated for all common relationships based on relationships of the same type and all common relationships based on relationships of different types. The common relationships based on relationships of different types can include all combinations of relationships based on different relationship types between node 308 and node 314.

All Jaccard coefficients for common relationships between node 308 and node 314 are assigned with weights and a weighted score can be generated using weighted Jaccard coefficients. In this example, the weighted score represents the strength of relationships between node 308 and node 314.

In this illustrative example, an edge can be generated between node 308 and node 314 based on the generated weighted score described above. As illustrated in graph 306, edge 316 is generated based on a weighted score using the Jaccard coefficients for all common relationships between node 308 and node 314. In this illustrative example, edge 316 represents the shortest distance between node 308 and node 314.

It should be appreciated that while the illustrative embodiments will be described herein with reference to the Jaccard coefficient as an example similarity coefficient used to measure closeness between nodes in accordance with illustrative embodiments, the illustrative embodiments are not limited to such. To the contrary, the illustrative embodiments may be implemented and operate with any currently known or later developed similarity coefficients without departing from the spirit and scope of the present invention.

Figure 4:
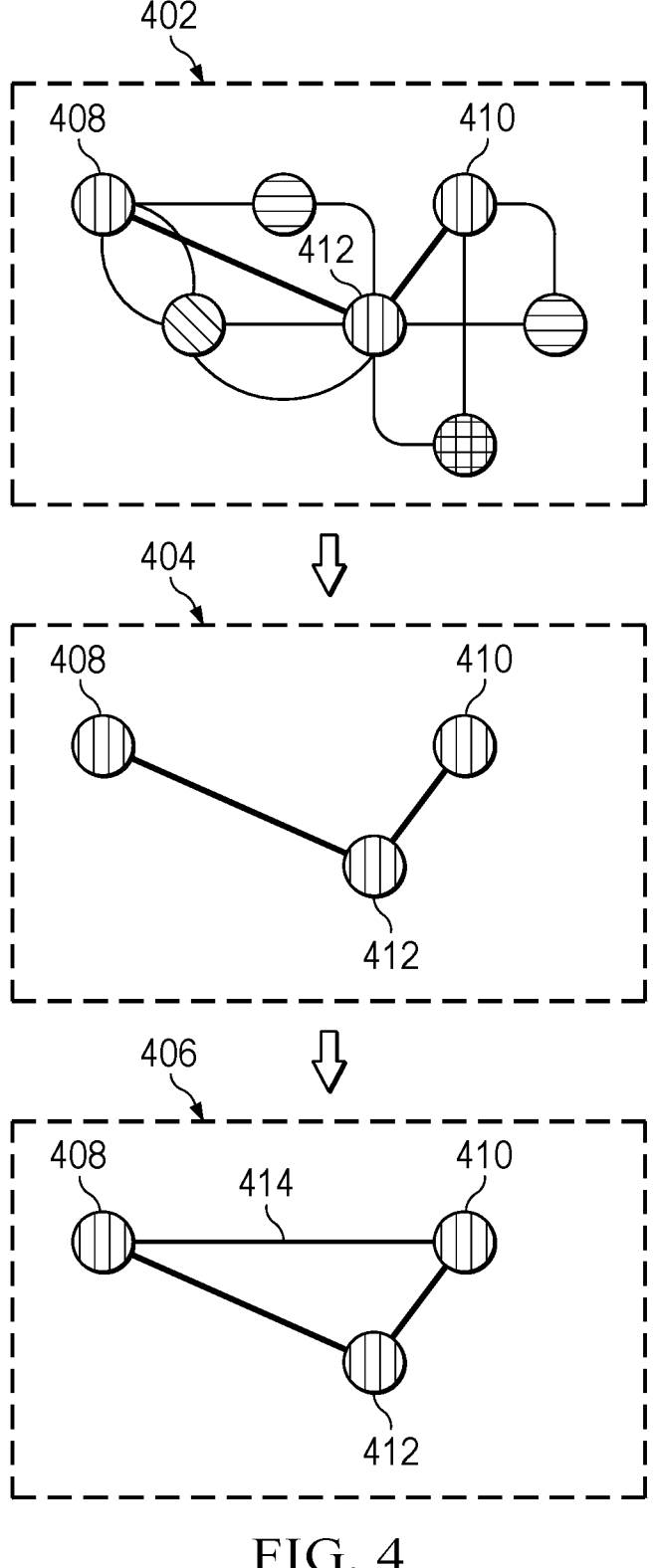
FIG. 4 is an illustration for identifying a path between two nodes on a graph in accordance with an illustrative embodiment.

Turning now to FIG. 4, an illustration for identifying a path between two nodes on a graph is depicted in accordance with an illustrative embodiment. In this illustrative example, the generation of the edge on the graph can be performed using graph manager 218 in FIG. 2.

In FIG. 4, graph 402 includes a number of nodes and edges between the number of nodes. In this illustrative example, a path can be identified between node 408 and node 410, as illustrated in graph 402 and graph 404. The path between node 408 and node 410 includes an edge between node 412 and node 410. As depicted in FIG. 4, the edge between node 408 and node 412 can be generated based on a weighted score that considers all common relationships between node 408 and node 412. In a similar fashion, the edge between node 412 and node 410 can be generated based on a weighted score that considers all common relationships between node 410 and node 412.

In this example, a value for path between node 408 and node 410 can be calculated based on the weighted score for edge between node 408 and node 412 and the weighted score for edge between node 412 and node 410. As depicted, the value for the path between node 408 and node 410 can be calculated in a number of ways. For example, the value can be calculated by multiplying the weighted score for edge between node 408 and node 412 and the weighted score for edge between node 412 and node 410. In an alternative example, the value can be calculated by adding the weighted score for the edge between node 408 and node 412 and the weighted score for edge between node 412 and node 410.

In this illustrative example, edge 414 can be generated based on the value calculated for the path between node 408 and node 410 as illustrated in graph 406. Edge 414 directly connects node 408 and node 410 to represent the path identified for node 408 and node 410.

In this illustrative example, node 408, node 410, and edge 414 between node 408 and node 410 can be highlighted when displayed on a graphical user interface. In addition, all paths generated between node 408 and node 410 can be ranked based on the value calculated for each path and highlighted on the graphical user interface.

In this example, edge 414 for the generated path can be visualized differently based on the value for each path. For example, edge 414 can have different thickness based on the values for each path. In addition, nodes in graph 402, 404, and 406 can also be visualized differently based on the nature of those nodes. For example, nodes in graph 402, 404, and 406 can have different color and size based on the importance and types for the nodes.

Figure 5:
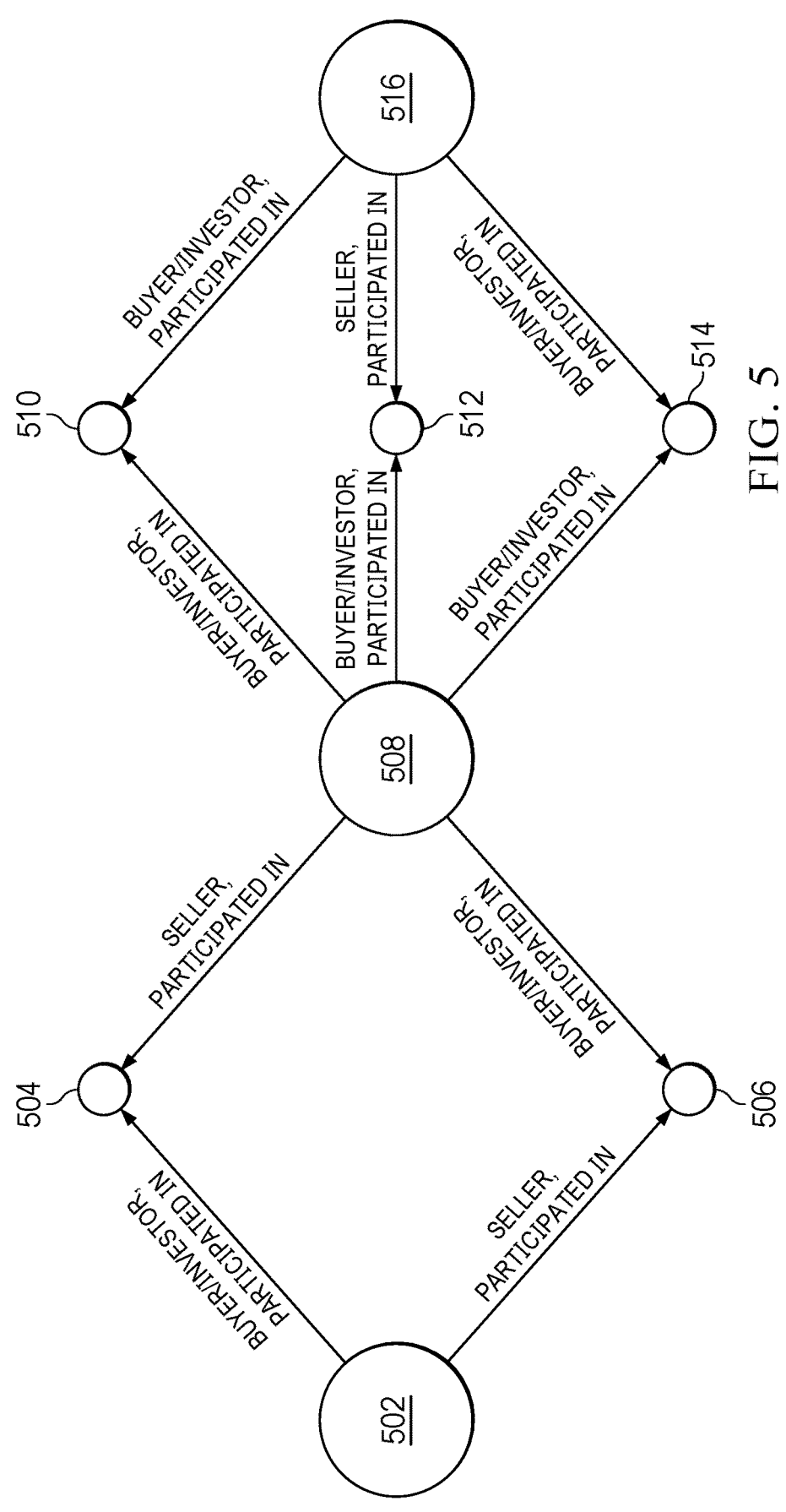
FIG. 5 is an illustration of a graph with transactions between companies in accordance with an illustrative embodiment.

Turning now to FIG. 5, an illustration of a graph with transactions between companies is depicted in accordance with an illustrative embodiment. In this illustrative example, the graph illustrated in FIG. 5 can be an example of graph 220 in FIG. 2.

In FIG. 5, nodes represent companies and transactions. In this illustrative example, node 504, node 506, node 510, node 512, and node 514 represent transactions and node 502, node 508, and node 516 represent companies that are involved in transactions.

In this illustrative example, the edges between nodes represent the interaction between companies and transactions. For example, the edge between node 502 and node 506 indicates that the company of node 502 is a seller in the transaction of node 506, and the edge between node 508 and node 506 indicates that the company of node 508 is a buyer in the transaction of node 506.

In a similar fashion, the edge between node 508 and node 512 indicates that the company of node 508 is a buyer in the transaction of node 512, and the edge between node 512 and node 516 indicates that the company of node 516 is a seller in the transaction of node 512.

In FIG. 5, edges and nodes can be visualized differently based on the characteristic associated with the edges. For example, edges can have different thickness based on the weighted scores for each edge or quantity of transactions represented by each edge. In addition, nodes in FIG. 5 can also be visualized differently based on the nature of those nodes. For example, nodes for seller companies and buyer companies can have different color and size.

Turning next to FIG. 6, a flowchart of a process for identifying relationships between nodes in a graph is depicted in accordance with an illustrative embodiment. The process in FIG. 6 can be implemented in hardware, software, or both. When implemented in software, the process can take the form of program instructions that are run by one or more processor units located in one or more hardware devices in one or more computer systems. For example, the process can be implemented in graph manager 218 in computer system 204 in FIG. 2.

The process begins by determining a count of relationships for each relationship type associated with each node in a pair of nodes on the graph (step 602). In this step, the relationship types are represented by edges connecting to the nodes in the pair of nodes.

The process determines a number of common relationships between the pair nodes for each relationship type from the number of relationship types (step 604).

The process determines a count for each common relationship from the number of common relationships between the pair nodes (step 606).

The process generates a similarity coefficient for each common relationship based on the count for each common relationship and the count of relationships (step 608). The process generates a weighted score to represent strength for relationships between the pair of nodes using the similarity coefficients (step 610). The process displays the pair of nodes on the graph based on value of the weighted score (step 612). The process terminates thereafter.

Turning next to FIG. 7, a flowchart of a process for determining common relationships between a pair of nodes on a graph is depicted in accordance with an illustrative embodiment. The process illustrated in FIG. 7 is an example of steps that can be implemented in step 604 in FIG. 6.

The process begins by determining a first set of common relationships based on edges of the same relationship type between the pair of nodes and common nodes connected to both nodes in the pair of nodes (step 702).

The process determines a second set of common relationships based on edges of different relationship types between the pair of nodes and common nodes connected to both nodes in the pair of nodes (step 704). The process generates the number of common relationships by combining the first set of common relationships and the second set of common relationships (step 706). The process terminates thereafter.

Turning next to FIG. 8, a flowchart of a process for determining paths between a pair of nodes on a graph is depicted in accordance with an illustrative embodiment. The process illustrated in FIG. 8 is an example of an additional step that can be performed with the steps in FIG. 6.

The process begins by identifying a first node and a second node from the graph (step 802). The process identifies a number of paths between the first node and the second node (step 804). In step 804, each path from the number of paths includes a number of edges for the weighted scores.

The process calculates a value for each path from the number of paths based on the weighted scores for edges from each path (step 806). The process ranks the number of paths based on the values (step 808). In this step, the process can rank the predetermined number of paths. For example, the process can rank the top 5 or top 10 paths from the number of paths based on the weighted scores for each path. The process terminates thereafter.

Turning next to FIG. 9, a flowchart of a process for displaying the pair of nodes on the graph is depicted in accordance with an illustrative embodiment. The process illustrated in FIG. 9 is an example of steps that can be implemented in step 612 in FIG. 6.

The process generates an edge between the pair of nodes for the weighted score (step 902). The process displays the edge between the pair of nodes for the weighted score (step 904). The process terminates thereafter.

Figure 10:
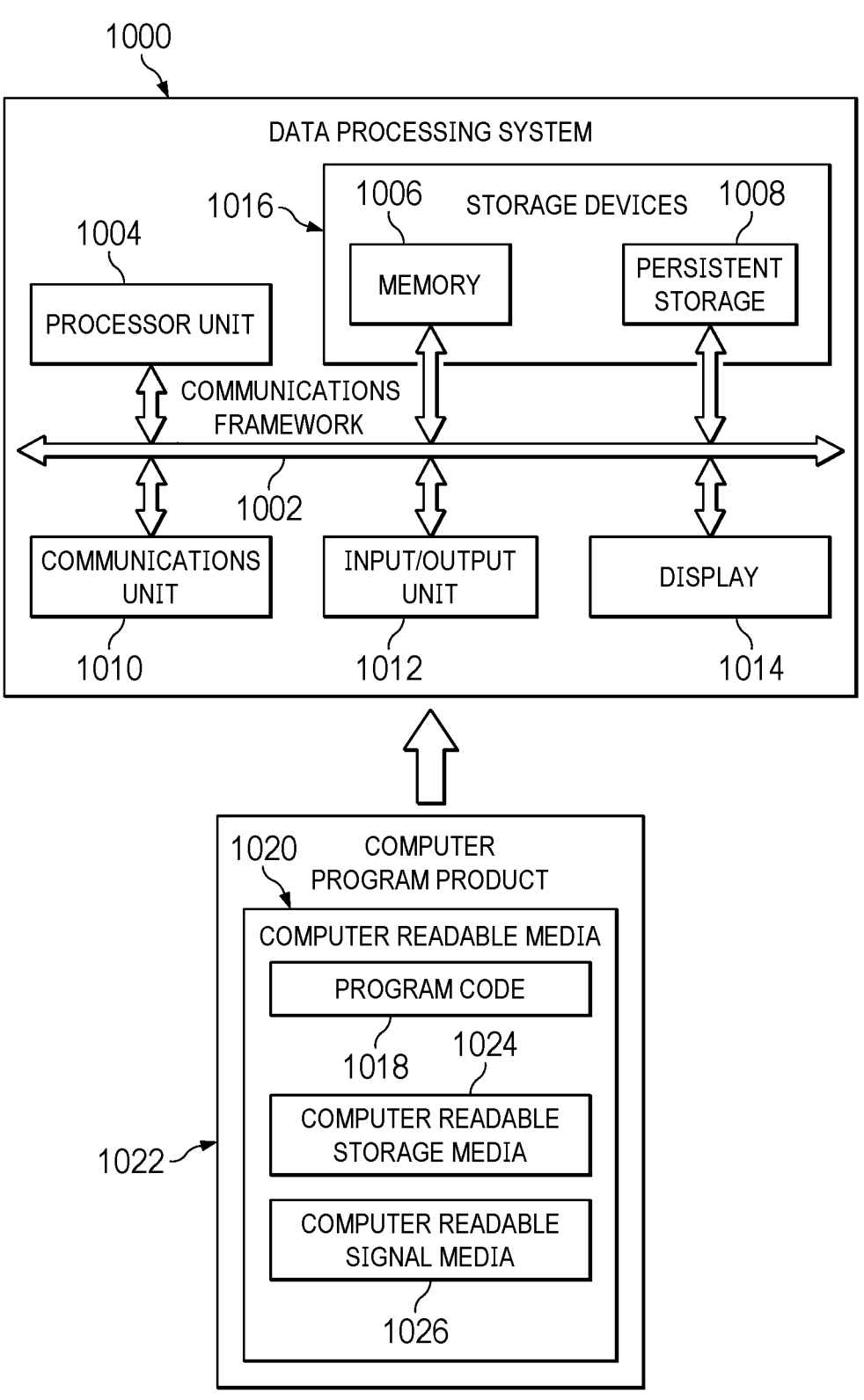
FIG. 10 illustrates a block diagram of a data processing system in accordance with an illustrative embodiment.

Turning now to FIG. 10, an illustration of a block diagram of a data processing system is depicted in accordance with an illustrative embodiment. Data processing system 1000 may be used to implement server computers 104 and 106 and client devices 110 in FIG. 1, as well as computer system 204 in FIG. 2. In this illustrative example, data processing system 1000 includes communications framework 1002, which provides communications between processor unit 1004, memory 1006, persistent storage 1008, communications unit 1010, input/output unit 1012, and display 1014. In this example, communications framework 1002 may take the form of a bus system.

Processor unit 1004 serves to execute instructions for software that may be loaded into memory 1006. Processor unit 1004 may be a number of processors, a multi-processor core, or some other type of processor, depending on the particular implementation. In an embodiment, processor unit 1004 comprises one or more conventional general-purpose central processing units (CPUS). In an alternate embodiment, processor unit 1004 comprises one or more graphical processing units (GPUS).

Memory 1006 and persistent storage 1008 are examples of storage devices 1016. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1016 may also be referred to as computer readable storage devices in these illustrative examples. Memory 1006, in these examples, may be, for example, a random access memory or any other suitable volatile or non-volatile storage device. Persistent storage 1008 may take various forms depending on the particular implementation.

For example, persistent storage 1008 may contain one or more components or devices. For example, persistent storage 1008 may be a hard drive, a flash memory, a rewritable optical disk, a rewritable magnetic tape, or some combination of the above. The media used by persistent storage 1008 also may be removable. For example, a removable hard drive may be used for persistent storage 1008. Communications unit 1010, in these illustrative examples, provides for communications with other data processing systems or devices. In these illustrative examples, communications unit 1010 is a network interface card.

Input/output unit 1012 allows for input and output of data with other devices that may be connected to data processing system 1000. For example, input/output unit 1012 may provide a connection for user input through at least one of a keyboard, a mouse, or some other suitable input device. Further, input/output unit 1012 may send output to a printer. Display 1014 provides a mechanism to display information to a user.

Instructions for at least one of the operating systems, applications, or programs may be located in storage devices 1016, which are in communication with processor unit 1004 through communications framework 1002. The processes of the different embodiments may be performed by processor unit 1004 using computer-implemented instructions, which may be located in a memory, such as memory 1006.

These instructions are referred to as program code, computer-usable program code, or computer readable program code that may be read and executed by a processor in processor unit 1004. The program code in the different embodiments may be embodied on different physical or computer readable storage media, such as memory 1006 or persistent storage 1008.

Program code 1018 is located in a functional form on computer readable media 1020 that is selectively removable and may be loaded onto or transferred to data processing system 1000 for execution by processor unit 1004. Program code 1018 and computer readable media 1020 form computer program product 1022 in these illustrative examples. In one example, computer readable media 1020 may be computer readable storage media 1024 or computer readable signal media 1026.

In these illustrative examples, computer readable storage media 1024 is a physical or tangible storage device used to store program code 1018 rather than a medium that propagates or transmits program code 1018. Computer readable storage media 1024, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Alternatively, program code 1018 may be transferred to data processing system 1000 using computer readable signal media 1026. Computer readable signal media 1026 may be, for example, a propagated data signal containing program code 1018. For example, computer readable signal media 1026 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 1000 are not meant to provide architectural limitations to the manner in which different embodiments may be implemented. The different illustrative embodiments may be implemented in a data processing system including components in addition to or in place of those illustrated for data processing system 1000. Other components shown in FIG. 10 can be varied from the illustrative examples shown. The different embodiments may be implemented using any hardware device or system capable of running program code 1018.

The flowcharts and block diagrams in the different depicted embodiments illustrate the architecture, functionality, and operation of some possible implementations of apparatuses and methods in an illustrative embodiment. In this regard, each block in the flowcharts or block diagrams can represent at least one of a module, a segment, a function, or a portion of an operation or step. For example, one or more of the blocks can be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams may be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component.

Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A computer implemented method for visualizing relationships between nodes on a graph, comprising:

determining, by a number of processor units, a count of relationships for each relationship type associated with each node in a pair of nodes on the graph by counting edges that represent relationships of the same relationship type for each node in the pair of nodes, wherein the relationship types are represented by edges connected to the nodes in the pair of nodes;

determining, by the number of processor units, a first set of common relationships based on edges of same relationship type between the pair of nodes and common nodes connected to both nodes in the pair of nodes;

determining, by the number of processor units, a second set of common relationships based on edges of different relationship types between the pair of nodes and common nodes connected to both nodes in the pair of nodes;

generating, by the number of processor units, the number of common relationships by combining the first set of common relationships and the second set of common relationships;

determining, by the number of processor units, a count for each common relationship from the number of common relationships between the pair of nodes;

generating, by the number of processor units, a similarity coefficient for each common relationship from the number of common relationships between the pair of nodes based on the count for each common relationship for the pair of nodes and counts of common relationships for relationship type of each common relationship from the number of common relationships between the pair of nodes, and wherein the counts of common relationships are determined based on common relationships between each node in the pair of nodes and other nodes on the graph;

generating, by the number of processor units, a weighted score to represent strength for relationships between the pair of nodes, wherein the weighted score is generated by assigning a weight to each of the similarity coefficients, and calculating the weighted score using the weights applied to the similarity coefficients; and displaying, by the number of processor units, the pair of nodes on the graph, wherein visualizations for the pair of nodes are adjusted based on the weighted score.

2. The computer implemented method of claim 1, wherein displaying, by the number of processor units, the pair of nodes on the graph based on value of the weighted score comprises:

generating, by the number of processor units, an edge between the pair of nodes for the weighted score.

3. The computer implemented method of claim 2 further comprises:

displaying, by the number of processor units, the edge between the pair of nodes for the weighted score.

4. The computer implemented method of claim 1 further comprises:

identifying, by the number of processor units, a first node and a second node from the graph; and identifying, by the number of processor units, a number of paths between the first node and the second node, wherein each path from the number of paths comprises a number of edges.

5. The computer implemented method of claim 1, wherein the similarity coefficients are Jaccard coefficients.

6. A computer system comprising:

a storage device that stores program instructions;

one or more processors operably connected to the storage device and configured to execute the program instructions to cause the computer system to:

determine a count of relationships for each relationship type associated with each node in a pair of nodes on a graph by counting edges that represent relationships of the same relationship type for each node in the pair of nodes, wherein the relationship types are represented by edges connected to the nodes in the pair of nodes;

determine a first set of common relationships based on edges of same relationship type between the pair of nodes and common nodes connected to both nodes in the pair of nodes;

determine a second set of common relationships based on edges of different relationship types between the pair of nodes and common nodes connected to both nodes in the pair of nodes;

generate the number of common relationships by combining the first set of common relationships and the second set of common relationships;

determine a count for each common relationship from the number of common relationships between the pair of nodes;

generate a similarity coefficient for each common relationship from the number of common relationships between the pair of nodes based on the count for each common relationship for the pair of nodes and counts of common relationships for relationship type of each common relationship from the number of common relationships between the pair of nodes, and wherein the counts of common relationships are determined based on common relationships between each node in the pair of nodes and other nodes on the graph;

generate a weighted score to represent strength for relationships between the pair of nodes, wherein the weighted score is generated by assigning a weight to each of the similarity coefficients, and calculating the weighted score using the weights applied to the similarity coefficients; and display the pair of nodes on the graph, wherein visualizations for the pair of nodes are adjusted based on the weighted score.

7. The computer system of claim 6, wherein display the pair of nodes on the graph based on value of the weighted score, the processors further execute instructions to:

generate an edge between the pair of nodes for the weighted score.

8. The computer system of claim 7, wherein the processors further execute instructions to:

display the edge between the pair of nodes for the weighted score.

9. The computer system of claim 6, wherein the processors further execute instructions to:

identify a first node and a second node from the graph; and identify a number of paths between the first node and the second node, wherein each path from the number of paths comprises a number of edges.

10. The computer system of claim 6, wherein the similarity coefficients are Jaccard coefficients.

11. A computer program product, the computer program product comprising a computer readable storage medium having program instructions embodied therewith, the program instructions executable by a computer system to cause the computer system to:

determine a count of relationships for each relationship type associated with each node in a pair of nodes on a graph by counting edges that represent relationships of the same relationship type for each node in the pair of nodes, wherein the relationship types are represented by edges connected to the nodes in the pair of nodes;

determine a first set of common relationships based on edges of same relationship type between the pair of nodes and common nodes connected to both nodes in the pair of nodes;

determine a second set of common relationships based on edges of different relationship types between the pair of nodes and common nodes connected to both nodes in the pair of nodes;

generate the number of common relationships by combining the first set of common relationships and the second set of common relationships;

determine a count for each common relationship from the number of common relationships between the pair of nodes;

generate a similarity coefficient for each common relationship from the number of common relationships between the pair of nodes based on the count for each common relationship for the pair of nodes and counts of common relationships for relationship type of each common relationship from the number of common relationships between the pair of nodes, and wherein the counts of common relationships are determined based on common relationships between each node in the pair of nodes and other nodes on the graph;

generate a weighted score to represent strength for relationships between the pair of nodes, wherein the weighted score is generated by assigning a weight to each of the similarity coefficients, and calculating the weighted score using the weights applied to the similarity coefficients; and display the pair of nodes on the graph, wherein visualizations for the pair of nodes are adjusted based on the weighted score.

12. The computer program product of claim 11, wherein display the pair of nodes on the graph based on value of the weighted score, the program instructions executable by the computer system to further cause the computer system to:

generate an edge between the pair of nodes for the weighted score.

13. The computer program product of claim 12, wherein the program instructions executable by the computer system to further cause the computer system to:

display the edge between the pair of nodes for the weighted score.

14. The computer program product of claim 11, wherein the program instructions executable by the computer system to further cause the computer system to:

identify a first node and a second node from the graph; and identify a number of paths between the first node and the second node, wherein each path from the number of paths comprises a number of edges.

15. The computer program product of claim 11, wherein the similarity coefficients are Jaccard coefficients.

\* \* \* \* \*